United States Patent
Green (10) Patent No.: US 6,701,322 B1
(45) Date of Patent: Mar. 2, 2004

(54) INTERACTIVE CUSTOMER-BUSINESS INTERVIEW SYSTEM AND PROCESS FOR MANAGING INTERVIEW FLOW

(75) Inventor: Brian L. Green, Gig Harbor, WA (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 151 days.

(21) Appl. No.: 09/588,750

(22) Filed: Jun. 7, 2000

(51) Int. Cl.7 .......................... G06F 17/00; G06F 15/16; G06F 17/60
(52) U.S. Cl. ........................... 707/102; 705/26; 705/27; 709/202
(58) Field of Search ........................... 707/102; 705/27, 705/26; 434/322; 709/202

(56) References Cited

U.S. PATENT DOCUMENTS

| | | | |
|---|---|---|---|
| 4,130,881 A | * 12/1978 | Haessler et al. ................. | 705/3 |
| 4,213,251 A | * 7/1980 | Foundos ..................... | 434/327 |
| 5,257,185 A | * 10/1993 | Farley et al. ................ | 707/100 |
| 5,319,740 A | * 6/1994 | Yamada et al. ................ | 706/59 |
| 5,500,891 A | 3/1996 | Harrington et al. | |
| 5,544,230 A | 8/1996 | Megyesi | |
| 5,878,403 A | 3/1999 | DeFrancesco et al. | |
| 5,909,570 A | 6/1999 | Webber | |
| 5,948,054 A | * 9/1999 | Nielsen ....................... | 709/200 |
| 5,960,411 A | * 9/1999 | Hartman et al. ............... | 705/26 |
| 5,987,116 A | 11/1999 | Petrunka et al. | |
| 6,014,632 A | 1/2000 | Gamble et al. | |
| 6,026,368 A | 2/2000 | Brown et al. | |
| 6,032,130 A | 2/2000 | Alloul et al. | |
| 6,035,283 A | 3/2000 | Rofrano | |
| 6,038,566 A | 3/2000 | Tsai | |
| 6,070,142 A | * 5/2000 | McDonough et al. ........... | 705/7 |
| 6,177,932 B1 | 1/2001 | Galdes et al. | |
| 6,289,373 B1 | * 9/2001 | Dezonno ..................... | 709/206 |
| 6,289,513 B1 | * 9/2001 | Bentwich ..................... | 717/11 |
| 6,430,597 B1 | * 8/2002 | Dilip et al. .................. | 709/202 |
| 6,574,621 B1 | * 6/2003 | Lautzenheiser et al. ........ | 707/4 |
| 6,601,100 B2 | * 7/2003 | Lee et al. ................... | 709/226 |

OTHER PUBLICATIONS

Article from Digisoft News, Summer 1999, vol. 4 Issue 2; http://www.digisoft.com/Summer99news.htm, printed Mar. 30, 2001.

(List continued on next page.)

*Primary Examiner*—Uyen Le
(74) *Attorney, Agent, or Firm*—Hunton & Williams LLP (57) ABSTRACT

A process for generating a script for an agent system of a business to use in conducting an interactive interview with a customer. The agent system is linked to a database which includes a questions table, an answers table and a branching table. The agent system retrieves a question from the questions table and a list of alternative answer choices for the retrieved question from the answers table. The agent system communicates the first question and the list of alternative answer choices to the customer. The agent system inputs the customer's selected one of the alternative answers to the branching table of the database. The branching table includes rules for determining the next one of the a questions to communicate to the customer based on the customer's selected answer.

9 Claims, 3 Drawing Sheets

OTHER PUBLICATIONS

Web page for Digisoft Computers Incorporated; http://www.digisoft.com/, printed Mar. 30, 2001.

Web page for Telescript Production Info., http://www.digisoft.com/TeleScript.htm, printed Mar. 30, 2001.

Salton "Some research problems in automatic information retrieval", ACM 1983, pp. 252–263.*

Bose et al "Application of intelligent agent technology for managerial data analysis and mining", The database for information systems, Winter 1999, vol. 30, No. 1, pp. 77–94.*

Frutos et al "Adapting computer–human interaction in real-time", IEEE 1998, pp. 1038–1043.*

Moulin et al "A multi–agent system supporting cooperative work done by persons and machines", IEEE 1999, pp. 1889–1893.*

Waltz "An English language question answering system for a large relational database" Communications of the ACM, Jul. 1978, pp. 526–539.*

Ardissono et al "A configurable system for the construction of adaptive virtual stores" World Wide Web, Mar. 1999, vol. 2, Issue 3, pp. 143–159.*

Ripper et al "V–Market: a framework for agent e–commerce systems", World Wide Web 2000, vol. 3, No. 1, pp. 43–52.*

Wolf et al "Evolution of the conversation machine: a case study of bringing advanced technology to the marketplace", CHI 98, Apr. 18–23, 1998, pp. 488–495.*

Schafer et al "Recommender systems in E–commerce", ACM 1999, pp. 158–166.*

* cited by examiner

INTERACTIVE CUSTOMER-BUSINESS INTERVIEW SYSTEM AND PROCESS FOR MANAGING INTERVIEW FLOW

FIELD OF THE INVENTION

The present invention relates generally to an interactive customer-business interview system and a related process for managing the interview flow. Specifically, the invention relates to a system and process for scripting questions, maintaining questionnaires used during customer interviews, and for asking follow-up questions based upon the customer's responses to prior questions.

BACKGROUND OF THE INVENTION

A business that interacts with large numbers of customers and clients, over a variety of communications channels including telephone, mail, Internet and in person, may desire a means to track those customer interactions for a variety of reasons including providing better service to existing customers, retaining new customers and to determine the means which is most effective at reaching or generating new customers and identifying existing customers to whom new services should be offered.

Additionally, with the increased consumer demand for Internet-based sales sites and catalog sales, and with the rise of the direct marketing industry and the increased use of outsourced sales and customer-service forces by many businesses, there is a need by businesses to provide "scripts" to their sales and customer-service forces who may not have intimate knowledge of all of the products they try to sell consumers over the phone or the companies whose products they are trying to sell.

Moreover, if businesses using such alternate communications channels had a means to collect data about customers, their buying patterns, their complaints, repeat business, and other such customer information and had a means to access such information while a customer-based interview was in progress, they could provide more efficient and effective service to such customers and could also tailor their marketing or service efforts specifically to individual customers.

For example, assume a hypothetical scenario in which a business has a customer call center staffed by agent personnel who field incoming customer calls. The business maintains a database which has a record corresponding to each customer who has ever placed a product order using the customer call center. Each record has information such as the customer's name, address and telephone number. A call center agent, upon answering an incoming customer call, may see a telephone number displayed representing the telephone number from which the incoming call was placed. The call center agent may query the call center database by inputting the telephone number for the incoming call to ascertain whether any records in the database list the same telephone number.

The business may also maintain software that can generate a script for the call center agent to use to assist the agent in handling the interview with the customer. For example, if the call center performs a sales-related function, then the script may include a number of questions designed to generate orders for particular products. Alternatively, if the call center performs a customer service function (e.g., an information services help desk to respond to customers' problems or errors when using software or computer systems), then the script may include questions designed to try to determine the specific computer error the customer is experiencing and the script may also set forth potential resolutions or fixes of the computer error. There are multiple other scenarios in which a business may employ a "script" for its personnel to use for multiple additional purposes. Those set forth above are meant to be illustrative only.

Businesses which have implemented customer-related systems and processes of the type described above have found many deficiencies in the current systems and processes. Many of the current systems/processes are not designed for applicability across multiple channels that a business may use to communicate with its customers. Businesses using such systems do not want to have to create and use multiple different customer systems for their telephone sales, catalog sales, Internet sales and in-person/store sales, for example.

Moreover, the prior systems/processes do not always integrate databases containing customer-specific records with their systems/processes which generate "scripts" for their sales forces. Therefore, the scripts may be deficient because they may not be designed to sell the business' most popular products, for example, or the scripts may not address the customer's specific inquiry. Or, the scripts may require an agent to ask each question contained in the script without the flexibility of customizing the questions based upon a specific customer's more particularized inquiries. (A good example of this scenario is when a call is placed to an automated voice messaging system which leads a caller through a list of predetermined potential choices of informational topics for which the caller may select one choice by pressing a number corresponding to the selected choice. If the customer has an inquiry that does not fall within one of the predetermined potential choices, the customer may hang up, or may select a choice merely to continue to hold the line, but may obtain information that is not responsive to the customer's actual inquiry.)

Additionally, since such existing systems/processes are generally not customized, they may require the agent to do significant re-programming to create the desired script for a particular application. Moreover, after the original customization of a script is completed, such preexisting systems/processes may nevertheless be deficient because they may require further programming in order to make any changes to the original customized script.

SUMMARY OF THE INVENTION

It is therefore an object of the present invention to provide an interactive system and process for managing an interview flow during a customer interaction which is applicable to multiple communications channels used by a particular business.

It is a further object of the invention to provide a system and process for generating customer-based scripts that are easily modified, adapted and maintained and that can be tailored to address the specific customer's needs.

It is an additional object of the present invention to provide an interactive system and process for managing an interview flow during a customer interaction which is flexible and uses the customer's response to a question to determine a follow-up question.

Additional objects and advantages of the present invention will be set forth in part in the description which follows, and in part will be obvious from the description, or may be learned by practice of the invention. The objects and advantages of the invention may be realized and attained by means of instrumentalities and combinations, particularly pointed out in the appended claims.

To achieve the objects and in accordance with the purpose of the invention, as embodied and broadly described herein, in its broadest aspects the present invention relates to a process for generating a script for an agent system to use in conducting an interactive interview with a customer wherein content of the script is controlled by data stored in a database. Preferably, the database comprises a questions table including a plurality of questions stored therein to be used by an agent conducting an interview with a customer, an answer table having stored therein a plurality of alternative answer choices responsive to each one of the plurality of questions, and a branching table having a plurality of rules stored therein for determining the sequence of the questions which the agent communicates to the customer based on the customer's selected answer to a preceding one or a first question. Specifically, the data stored in the database is used to control the order in which the plurality of questions in the script are asked of the customer.

The steps in the process include a first step wherein the agent system retrieves a first question from the questions table in the database and a list of a plurality of alternative answer choices for the first question from the answers table in the database. The agent system then communicates the first question and the list of the plurality of alternative answer choices for the first question to the customer. The customer selects an answer from the list of the plurality of answer choices communicated by the agent and the agent system determines a next question based on the selected answer and a branching rule stored in a branching table for such selected answer in the database. The agent system then retrieves the next question from the questions table and a list of a plurality of alternative answer choices for the next question from the answers table and communicates the next question and the list of alternative answer choices for the next question to the customer. The above steps are repeated until an "end" statement is retrieved from the branching table.

The process for generating a script in accordance with the present invention is advantageous because the generated script can be easily customized to specific customers or product lines or other specific uses of a business without the need for re-programming.

Generally, instead of being controlled by program code, data stored in the database tables controls the order of questions to be asked during the interactive customer interview. Moreover, adding, changing or removing questions from the script, and re-ordering the sequence of the questions used in the script can be accomplished by simply updating the database tables rather than writing an entirely new computer program.

DETAILED DESCRIPTION OF THE INVENTION

Reference will now be made in detail to the present preferred embodiment of the invention, an example of which is illustrated in the accompanying drawings in which like reference characters refer to corresponding elements.

Figure 1:
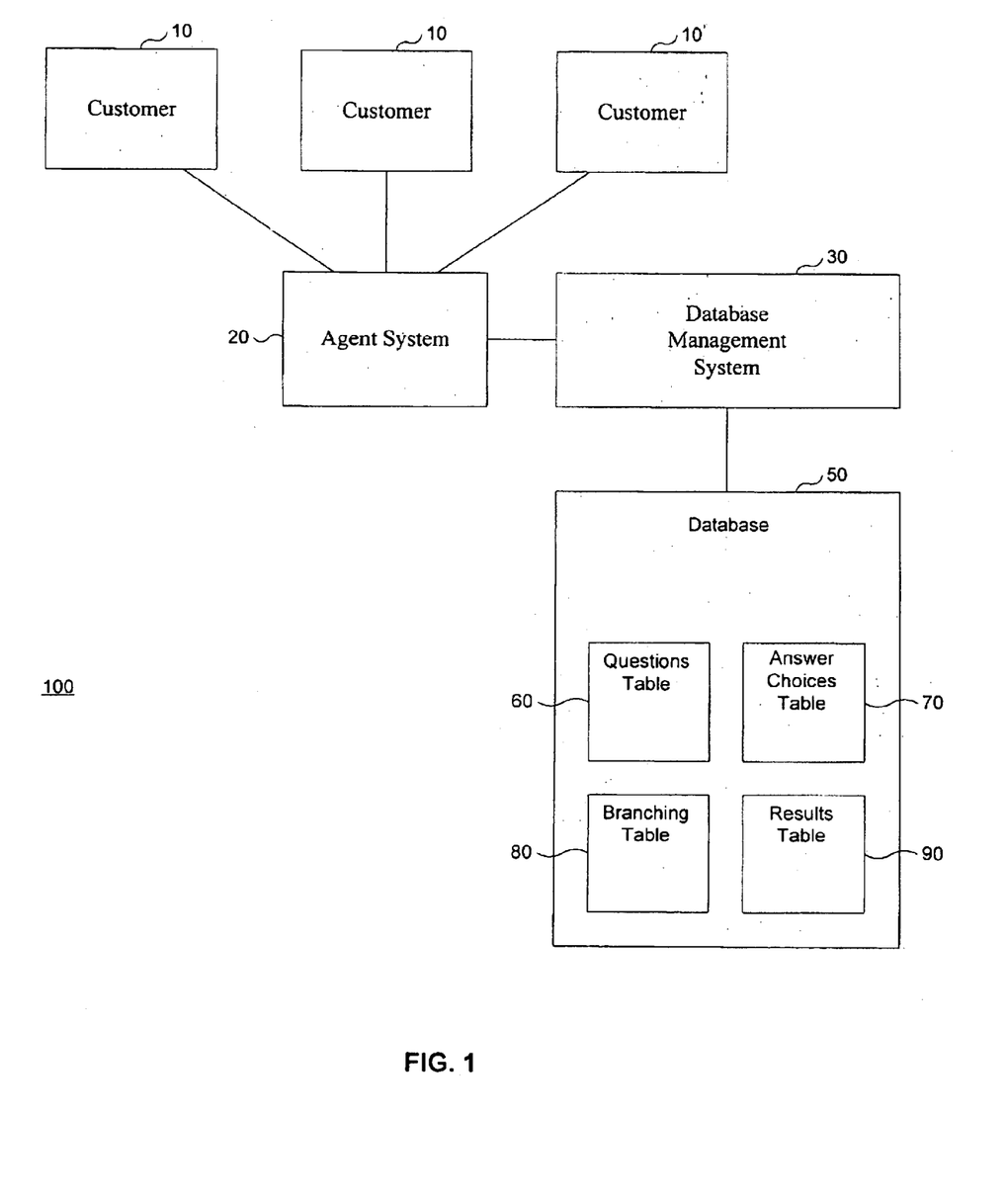
FIG. 1 is a simplified block diagram of steps in a customer-business interview system according to one embodiment of the present invention.

FIG. 1 illustrates a customer-business interview system 100 in accordance with a preferred embodiment of the invention. As shown in FIG. 1, a plurality of customers 10 can interact with a business through an agent system 20 which serves as a gateway to information and services provided by the business. Agent system 20 represents a variety of means by which the business may interact with customers 10. For example, a customer 10 may interact in person or over the telephone with an agent system 20 of the business. Another means of customer-business interaction may include an on-line computer application implemented by connecting a customer's computer to the business' system 100 over a data channel, such as a modem connection. The data channel may also couple an application at the customer's site to the business' system 100 over a wide area network (WAN) such as the Internet. Also, the online application may be a Web browser coupled to a Web server that is part of the agent system 20 of the business.

Generally, the agent system 20 is operably linked to a database 50 for storing and retrieving information about the business and its products and/or services, the customer 10 and any prior interactions between the customer 10 and the business. Preferably, database 50 is a relational database and includes a questions table 60, an answer choices table 70, and a branching table 80. Questions table 60 includes a plurality of questions stored therein to be used by the agent system 20 in conducting an interview with a customer 10. The plurality of questions can be tailored or customized to the particular needs of the business. For example, a business engaged in selling products or services may tailor the questions to be specific to a particular one of the products or services it offers. Another business that is directed to providing customer support for products or services that have previously been sold to a customer may tailor its questions to be directed towards solving particular problems that customers may be experiencing with the business' products or services. If the business is a type that engages in development of new products/services, the list of questions could be directed to researching products/services currently in use by customers which are similar to the product/service under development in order to assess perceived deficiencies in such current product/services to tailor the design of the product/service under development to address such perceived deficiencies. As can be readily appreciated by one of ordinary skill in this field, however, there are numerous variations and possibilities for the list of questions depending upon the different situations in which the business interacts with its customers.

The answer choices table 70 has stored therein a plurality of alternative answer choices responsive to each one of the plurality of questions stored in questions table 60. The branching table 80 has a plurality of rules stored therein for determining the sequence of the questions in the script used by the agent system 20 to communicate with the customer 10. The rules define which question of the plurality of questions stored in questions table 60 will be the next question to be communicated to the customer 10 based upon the customer's selected answer to a preceding question.

Preferably, the tables 60, 70 and 80 are relational databases having their entire information content arranged as explicit values in fields of column and row positions. Tables 60 and 70 have a common question identifier column. Table 60 further has a second column with the script for each question. Table 70 has a second column with the alternative answer choices for each question. Table 80 has two columns common with table 70, namely, the question identifier column and the alternative answer choices column. A third column in table 80 contains branching rules which indicate the next question to be communicated to customer 10 for a selected answer to the preceding question. Each row in table 80, therefore, represents, on the conceptual level, a logical operation. For example, the first row of table 80 will be retrieved by the agent system 20 if a "Yes" answer to question Q1 was selected, and will instruct the agent system 20 to retrieve question Q2 as the next question.

Database 50 may also include a results table 90 for storing the answers of the customer 10 during a particular customer-business interview for future reference.

Between the database 50 and the agent system 20 is a layer of software 30, known variously in the art as a database manager or a database server or, most commonly, a database management system ("DBMS"). The agent system 20 may further include a program which functions to allow the agent system 20 to access the database 50 such as, for example, from an on-line workstation or terminal. Alternatively, the agent system 20 can access the database 50 through an interface provided as an integral part of the DBMS 30. This interface can be a built-in application (not user-written) provided by a vendor of the DBMS system.

According to one embodiment of the present invention, the customer 10 interacts with the business through an automated, telephone, call-center system. According to this embodiment, the customer 10 communicates with the agent system 20 for the business over a telephone channel (not shown). Preferably, the information retrieved from the database 50 is displayed on a computer screen of a human agent handling the customer call. The system 100 further includes means for management of telephone call centers.

One example software program for managing inbound or outbound calls in a telephone, call-center system is a software program marketed by Digisoft Computers, Inc., which is known as Telescript. (Telescript versions 5.0 or 5.1 are the preferred versions.) The telephone call center management means is designed as an open database that provides links to various type of database engines such as those marketed by Access, SQL and Oracle. The telephone call center management means utilizes CTI-enabled advanced dialing, scripting and reporting capabilities. The telephone call center management means provides links between the call center agent system 20 and database 50 for storing and retrieving information relating to inbound and outbound customer calls and for recording customer call results. Moreover, the telephone call center management means reads and writes information between scripts displayed on the computer screen of a workstation in the agent system 20 and tables 60, 70, and 80 in database 50.

Figure 2:
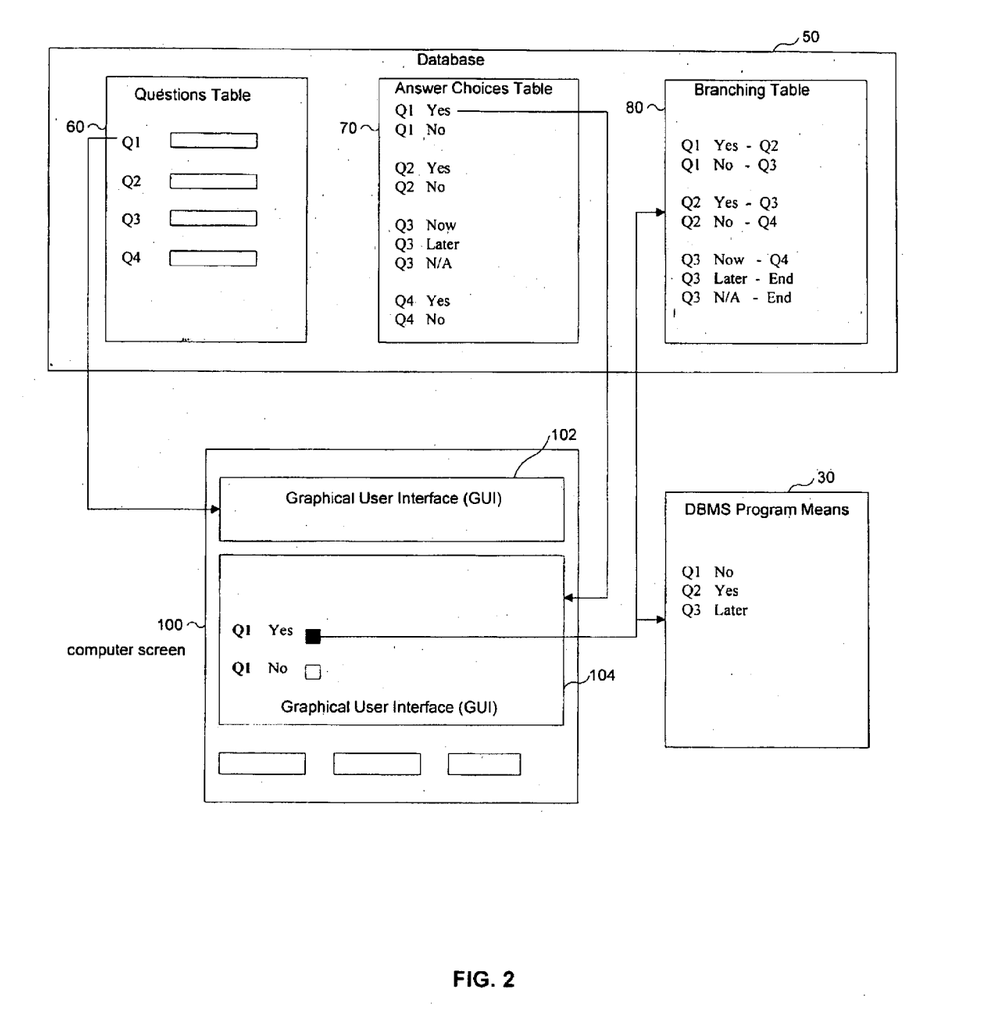
FIG. 2 is a simplified block diagram of a database and a script graphical user interface according to one embodiment to the present invention.

Referring to FIG. 2, and as explained above, database 50 includes question table 60 which includes a list of questions identified as Q1, Q2, Q3 and Q4, etc. and an alternative answer choices table 70 containing a list of possible alternative answer choices for each question from table 60. For instance, table 70 contains a "Yes" and a "No" answer for each of the questions Q1, Q2 and Q3 and a "Now," "Later" and "N/A" answer for question Q4. Database 50 further contains a branching table 80 which includes rules stored therein for determining the sequence of the questions which the agent system 20 communicates to the customer 10 based on the customer's selected answer to each preceding question. Specifically, according to the data stored in the first row of Table 80 if the customer answers "Yes" to question Q1, then the rule in branching table 80 for that selected answer to Q1 instructs the agent system 20 to branch to question Q2. Alternatively, if the customer answers "No" to Question Q1, then the rule in branching table 80 for that selected answer to Q1 instructs the agent system 20 that the next question will be Q3.

For example, to illustrate the system and process in more detail, assume the following hypothetical scenario. Assume the business is a financial institution which offers a plurality of financial products and services to customers 10 including various investment products such as money market accounts, certificates of deposit, annuities, mutual funds, stocks, bonds, etc. The business has designed a script for use by its customer service representatives in dealing via telephone with customers' requests for changes in their investment accounts or customers' questions. A customer 10 has initiated a call to the agent system 20 of the business and has requested to withdraw his funds from his investment account with the business. The flow through the script process for this customer interview is as follows:

The agent system 20 retrieves the first question Q1 from questions table 60 and a corresponding list of alternative answer choices for the first question Q1 from answers table 70.

The agent system 20 then communicates the first question Q1 and the list of alternative answer choices corresponding to the first question Q1 to the customer 10.

Q.1: What are your reasons for your withdrawal request?

A1: Higher rate of return.

A2: Changing to a different product.

A3: Consolidating accounts.

The branching table 80 includes rules for each possible alternative answer choice for the first question Q1 which instruct the agent system 20 which question to branch to next and to communicate to the customer 10. For example, for the possible answer choices for the first question Q1, the branching table 80 includes branching rules as follows:

Q.1: What are your reasons for your withdrawal request?

Alternative Answer Choices:
1) Higher rate of return→ask Q.5, Q.6, Q.7 and Q.8
2) Changing to a different product→ask Q.5, Q.6, Q.7 and Q.8
3) Consolidating accounts→ask Q.2, Q.3 and Q.4

Assume the customer 10 responds to question Q1 by selecting answer choice 3. The agent system 20 performs a lookup function with respect to the data stored in branching table 80 for a match with answer choice 3 for question Q1. Then, the agent system 20 is instructed to branch to question Q.2 by the rule included in branching table 80 for answer choice 3 and the agent system retrieves question Q.2 from questions table 60 and the possible alternative answer choices for question Q.2 from answer table 70 and communicates question Q2 and the alternative answer choices for question Q.2 to customer 10.

Assume instead that the customer 10 responds to question Q.1 with a different alternative answer choice than that described above, for example, as shown below:

Q.1: What are your reasons for your withdrawal request?
1) Higher rate of return→ask Q.5, Q.6, Q.7 and Q.8
2) Changing to a different product→ask Q.5, Q.6, Q.7 and Q.8
3) Consolidating accounts→ask Q.2, Q.3 and Q.4

If, the customer 10 responds to question Q.1 by selecting answer choice 1, then the branching rule in branching table 80 corresponding to answer choice 1 for question Q1 instructs the agent system 20 to branch to question Q.5.

Agent system 20 retrieves question Q.5 from questions table 60 and the alternative answer choices for question Q.5 from the answer table 70 and communicates this retrieved information to customer 10.

Q.5: What kind of account or investment are you moving these funds to?

Alternative Answer Choices:
1) Fixed Annuity→ask Q.6
2) Variable Annuity→ask Q.6
3) Mutual Fund→ask Q.6
4) Stocks→ask Q.6
5) Bonds→ask Q.6
6) U.S. Government Securities→ask Q.6
7) CD→ask Q.6
8) Savings→ask Q.6
9) Other→ask Q.6
10) Don't Know→ask Q.8
11) Refused→ask Q.8

Assume the customer selected answer choice 1, then the branching rule for answer choice 1 to question Q.5 from branching table 80 instructs agent system 20 to go to question Q.6. Agent system 20 retrieves question Q.6 from questions table 60 and the alternative answer choices to question Q.6 from answers table 70 and communicates them to customer 10.

Q.6: What is the interest rate you are being offered?

Alternative Answer Choices:
1) 1–1.99→ask Q.8
2) 2–2.99→ask Q.8
3) 3–3.99→ask Q.8
4) 4–4.99→ask Q.8
5) 5–5.99→ask Q.8
6) 6–6.99→ask Q.8
7) 7–7.99→ask Q.8
8) 8–8.99→ask Q.8
9) 9–9.99→ask Q.8
10) 10+→ask Q.8
11) Don't Know→ask Q.8
12) Refused→end Assuming customer 10 responded to question Q.6 by selecting one of answer choices 1–11, the process proceeds with question Q.8.

Q.8: Is there someone assisting you with this change?

Alternative Answer Choices:
1) Yes→ask Q.9
2) No→end
3) Don't Know/Refused→end Assuming customer 10 responded to question Q.8 by selecting answer choice 1, the process proceeds to question Q.9.

Q.9: Is this the same person who originally sold you the annuity?

Alternative Answer Choices:
1) Yes→end
2) No→end
3) Don't Know→end
4) Refused→end The process then concludes.

As illustrated in FIG. 2, the human interface for the process described above is implemented as follows. The DBMS program means 30 will retrieve for the agent system 20 a first question Q1 from questions table 60 and display it on a computer screen 100 using a graphical user interface (GUI) 102. The DBMS program means 30 also will retrieve for the agent system 20 a list of all possible alternative answer choices for the displayed first question Q1 from table 70 and display them in GUI 104. Upon selection of an alternative answer choice by the customer 10, the DBMS program means 30 will retrieve the next question based on the question identifier stored in the third column of table 80 from a row wherein the first two values stored in columns 1 and 2 match the question identifier for the previous question and the selected answer for that question, respectively. Thus, as shown in FIG. 2, the question identifier Q1 together with the selected alternative answer choice "Yes" serve as the key for retrieving the data stored in table 80 for determining which question the DBMS program means 30 should retrieve from table 60 and display next. The DBMS program means 30 will then read the next question Q2 from table 60 and will repeat the above steps until an "End" statement is retrieved from table 80. The DBMS program means 30 may also transmit each question together with the selected alternative answer choice to be stored in the answers table 80 to be used for future reference. It should be appreciated that tables 60 and 70 may contain as many questions and answers as desired by the business as is suitable for the specific purpose for which the customer interview script is designed. Also, it should be appreciated that the process of the present invention can be used with any branching scheme stored in database 80 so long as the selected answer to each question is used to determine the next question the agent system 20 should communicate to the customer 10.

Figure 3:
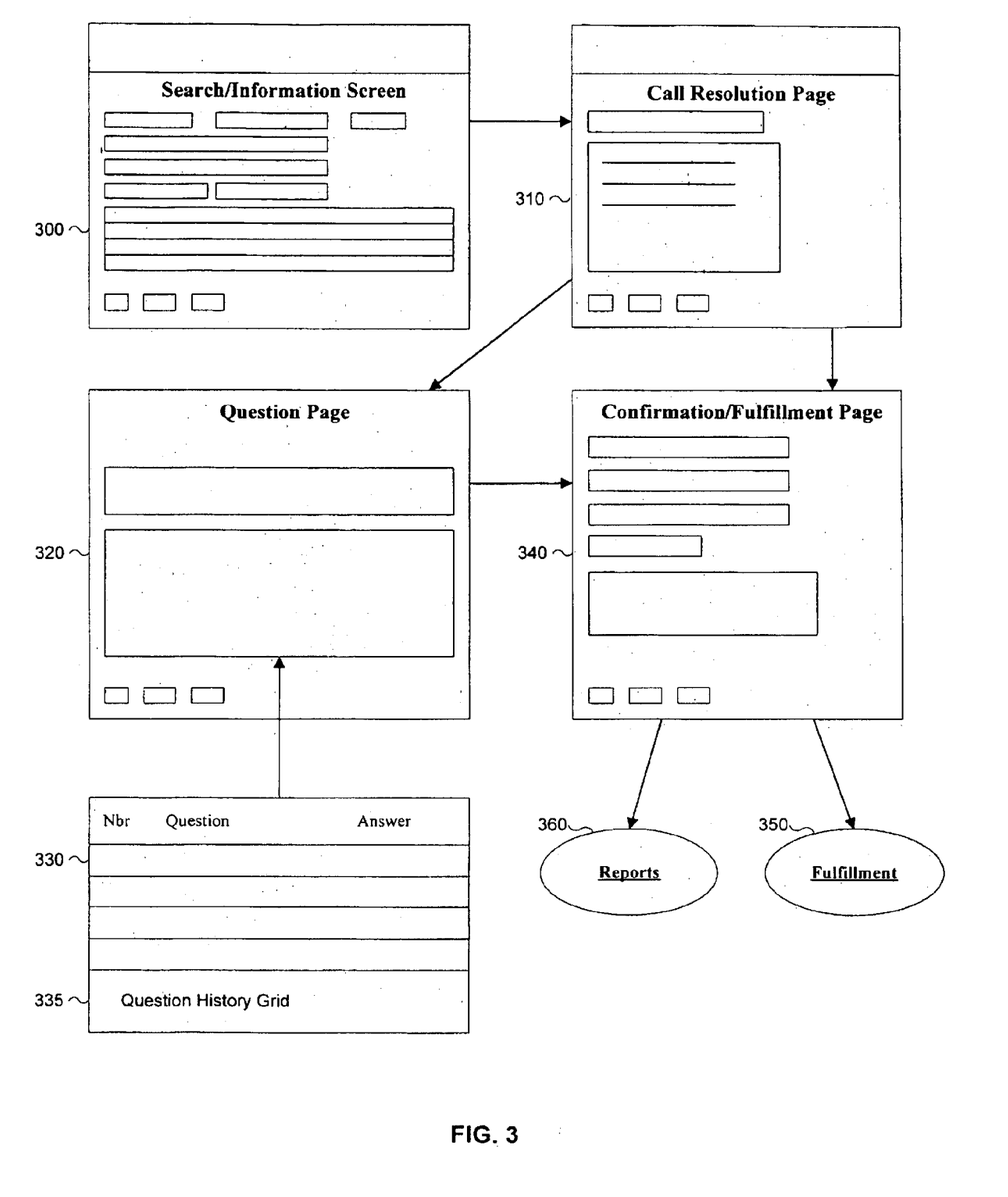
FIG. 3 is a simplified block diagram and flow diagram of steps in a customer-business interview process according to one embodiment of the present invention.

FIG. 3 illustrates a direct sales script flow diagram for a typical telephone, call-center business-customer interview. Accordingly, when an inbound customer call is received, or a human agent of agent system 20 makes an outbound call to a customer 10 the system 100 generates a search/information screen 300. The search/information screen 300 may display, for example, a customer's name and address, as well as results from any previous interviews conducted by the business with the customer 10. The various fields, indicated by the rectangles in screen 300, can be populated with information collected through sales leads or previous customer call-ins. This information is stored in a customer database file (not shown) in database 50. If the customer 10 is a new customer, the agent may physically enter the customer information (i.e., name and address) which will then be stored for future use in the customer database file. With the use of an identifier such as, for example, the customer's telephone number, the customer information stored in the customer database file can be automatically retrieved and displayed by agent system 20 in the search/information screen 300 during future customer-business interviews.

Customer call outcomes may then be listed in a call resolution page 310 for those customer calls requiring a resolution. The agent fills out the resolution page 310 making a subjective assessment of the quality of the lead. A questions page 320 is then automatically generated by agent system 20. The questions page 320 displays a first question retrieved from questions table 60 and the corresponding alternative answer choices to the question retrieved from answers table 70. The questions page 320 is refreshed with each new question. The sequencing of the questions is determined based on the selected answer to each preceding question according to the aforementioned branching rules stored in table 80. It should be appreciated, however, that agent system 20 may have more than one set of tables 60, 70 and 80 depending on the complexity of the business and the purposes for which different customer scripts may be required by the business (i.e., sales customer service/support, etc.). The agent system 20 will link to the appropriate set of tables to generate the appropriate script and questions page 320 based on information collected during the initial stage of a customer telephone call concerning the reasons the customer 10 placed the call. A question history grid 335 is displayed under the responses/choices section 330 of the GUI for easy quick reference by the agent. If the customer 10 is interested in making a purchase of a product or service, a confirmation/fulfillment page 340 is displayed by system 100 to be filled out by the agent confirming the customer's name and address data and resolving any product/service fulfillment needs of the customer. A fulfillment letter customized for the particular customer is then generated by system 100. System 100 may also generate real-time reports 360 for displaying information or agent, team and call-center sales statistics, such as, dialing rates, contact ratios, and agents' productivity.

As is readily apparent from the above detailed description, the process and system of the present invention can be used in multiple communications channels in which a business interacts with customers. It is also highly flexible and can be easily modified and customized to fit specific customer situations.

The invention has been described with particular reference to preferred embodiments which are intended to be illustrative rather than restrictive. Alternative embodiments will become apparent to those skilled in the art to which this invention pertains without departing from its spirit and scope. Thus, variations and modifications of the present invention can be effected within the spirit and scope of the following claims.

I claim:

1. A multiple communication channel process for generating a personalized script for an agent system of a business to use in conducting an interactive interview with a customer in-person, over a telephone, a computer, or a network, the process comprising the steps of:

constructing a database connected to said agent system, said database having a plurality of tables for storing information arranged as explicit values in fields of columns and row positions, said plurality of tables including a questions table having a plurality of questions stored therein, an answers table including a plurality of alternative answer choices responsive to each one of said plurality of questions stored therein, a branching table having a plurality of rules stored therein for determining the sequence of the questions which the agent system communicates to the customer, and a results table for storing at least the selected answers of the customer for future reference, said questions and answers tables having a common question identifier column, said branching table having two columns in common with the answers table;

the agent system generating and presenting the personalized script to at least one agent by retrieving a first question from said questions table and a list of a plurality of alternative answer choices for said first question from said answers table, the first question based on selected answers stored in the results table if the customer is a repeat customer, said personalized script relating information about the customer's buying patterns, complaints, repeat business, and suggested resolutions to the customer's needs, and further comprising: (1) a search/information page displaying biographical information on the customer and results from previous interviews with the customer, (2) a call resolution page for inputting subjective assessments of the interview by the agent, (3) a questions page for presenting questions and alternative answer choices, said questions relating to alternative products the customer may purchase and/or servicing of products previously purchased by the customer, (4) a question history page for displaying past questions presented to the customer, and (5) a confirmation/fulfillment page for resolving the customer's needs;

the agent system communicating the first question and said list of the plurality of alternative answer choices for said question to the customer;

the customer selecting one of the plurality of alternative answer choices for the first question from said list of the plurality of alternative answer choices;

following transmission of the selected one answer to the database, storing at least one of the first question and the selected one answer in the results table for future reference; and determining the next at least one of the plurality of questions to communicate to the customer based on the selected one answer and the plurality of rules stored in said branching table wherein the plurality of rules are organized to correspond to each one of the questions and to each one of the plurality of alternative answers for each one of the questions and wherein for the selected one answer to the first question, the rules define the next one question.

2. The multiple communication channel process of claim 1, wherein the process further comprises the steps of:

retrieving the next one of the plurality of questions from said questions table and a list of a plurality of alternative answer choices for the next question after the determining the next one of the plurality of questions step;

communicating the next question and said list of answer choices for the next question to the customer; and repeating the determining, retrieving and communicating the next question steps until each of the plurality of questions have been communicated to the customer and the customer has selected an answer for each of the plurality of questions.

3. The multiple communication channel process of claim 1, wherein said agent system is an on-line computer application accessible to the customer over the Internet.

4. The multiple communication channel process of claim 1, wherein said agent system includes an automated telephone system and wherein the customer receives automated voice commands from the agent system and responds to said voice commands by manual input using a telephone keypad.

5. The multiple communication channel process of claim 1, wherein said interactive interview with the customer is a direct sales, telemarketing campaign conducted by the business.

6. A multiple communication channel system for generating a personalized script to use in conducting an interactive interview with a customer in-person, over a telephone, a computer, or a network, the system comprising:

an agent system for generating and presenting the personalized script to at least one agent, said personalized script relating information about the customer's buying patterns, complaints, repeat business, and suggested resolutions to the customer's needs, and further comprising: (1) a search/information page displaying biographical information on the customer and results from previous interviews with the customer, (2) a call resolution page for inputting subjective assessments of the interview by the agent, (3) a questions page for presenting questions and alternative answer choices, said questions relating to alternative products the customer may purchase and servicing of products previously purchased by the customer, (4) a question history page for displaying past questions presented to the customer, and (5) a confirmation/fulfillment page for resolving the customer's needs; and a database management system, connected to said agent system, and including a database having a plurality of tables for storing information arranged as explicit values in fields of column and row positions, said database including a questions table having a plurality of questions stored therein, an answers table having a plurality of alternative answers for each one of said plurality of questions stored therein a branching table having a plurality of rules stored therein for determining the order in which the agent system communicates the plurality of questions to the customer, and a results table for storing at least the selected answers of the customer for future reference, said questions and answers tables having a common question identifier column, said branching table having two columns in common with the answers table.

7. The multiple communication channel system of claim 6, wherein said agent system includes a network call-center system and said database management system includes a call-center management program and CTI-enabled advanced dialing, scripting and reporting capabilities.

8. The multiple communication channel system of claim 6, wherein said agent system includes an on-line computer application accessible to the customer via the Internet.

9. The multiple communication channel system of claim 6, wherein the database further includes a call resolution table having data stored therein corresponding to a resolution of each interactive interview with a customer.

* * * * *